(No Model.)
L. H. SNYDER & W. G. CHRISTIAN.
FLOOR AND CEILING PLATE.
No. 605,024. Patented May 31, 1898.
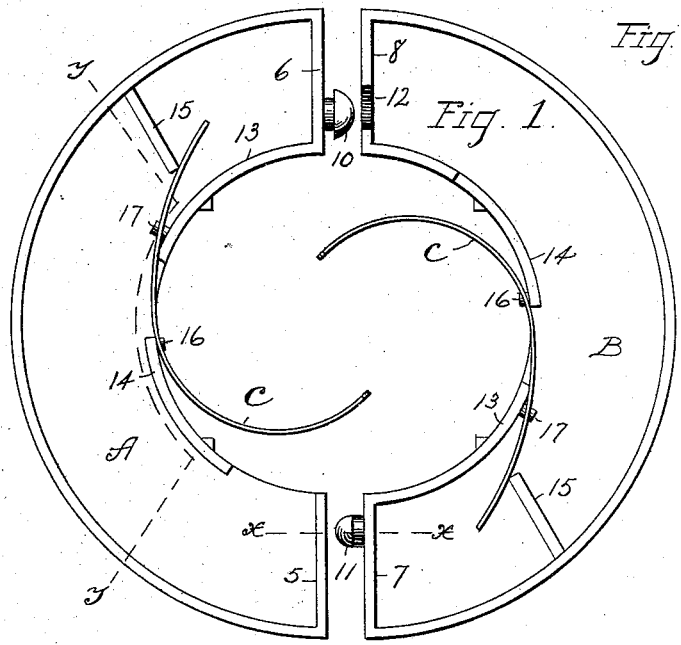
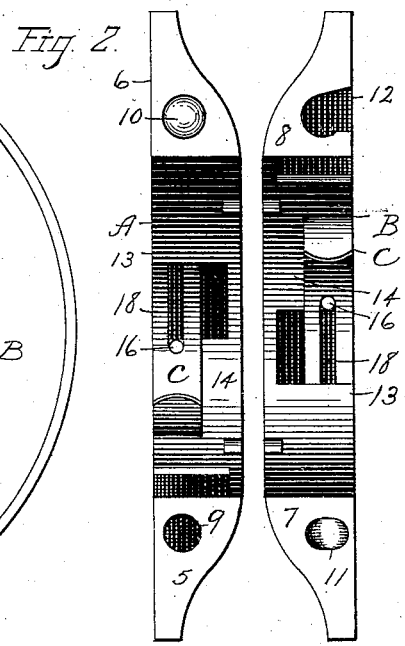
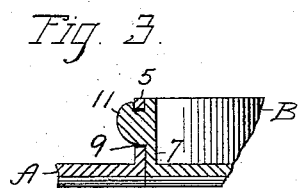
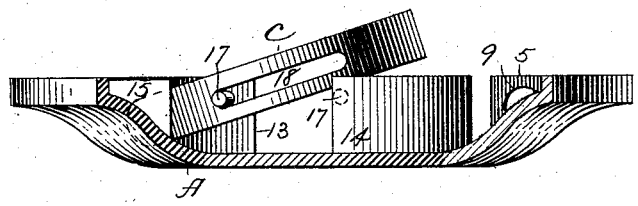
Witnesses
Geo. W. Stipek
D. A. Harris
Inventors
Lyman H. Snyder
William G. Christian
By James Shepard.
Atty.
THE NORRIS PETERS CO., PHOTO-LITHO., WASHINGTON, D. C.

UNITED STATES PATENT OFFICE.

LYMAN H. SNYDER AND WILLIAM G. CHRISTIAN, OF ROCKY HILL, CONNECTICUT; SAID CHRISTIAN ASSIGNOR TO SAID SNYDER.

FLOOR AND CEILING PLATE.

SPECIFICATION forming part of Letters Patent No. 605,024, dated May 31, 1898.

Application filed November 9, 1897. Serial No. 657,953. (No model.)

*To all whom it may concern:*

Be it known that we, LYMAN H. SNYDER and WILLIAM G. CHRISTIAN, citizens of the United States, residing at Rocky Hill, in the county of Hartford and State of Connecticut, have invented certain new and useful Improvements in Floor and Ceiling Plates, of which the following is a specification.

Our invention relates to improvements in floor and ceiling plates; and the objects of our improvement are simplicity and economy in construction and general efficiency of the article.

In the accompanying drawings, Figure 1 is a plan view of our ceiling-plate, showing the inner side with the two parts detached and slightly separated. Fig. 2 is an edge view showing the confronting faces of both parts of the plate. Fig. 3 is a partial sectional view on the line $x\,x$ of Fig. 1, showing the two parts locked together; and Fig. 4 is a sectional view on the line $y\,y$ of Fig. 1 with the spring only partially in place, thereby illustrating the manner of putting said spring into place.

The two parts A and B are in the main of an ordinary form of two-part floor and ceiling plates. Their meeting ends are provided with walls 5, 6, 7, and 8, the wall 5 of the part A having a round hole 9 through it, while wall 6 of the said part A is provided with a headed projection 10 in substantially the form of a short rivet or screw. The wall 7 of the part B is provided with a hooked projection 11, with its hook projecting on that side which faces the straight side of said part B. The shank of this hook may be of a size that will substantially fill the round hole 9, while its hook projects therefrom sufficiently to prevent the hooked projection from being passed through said hole excepting when the two parts of the plate are tipped out of their parallel position—as, for example, so as to rock on the upper edges of the walls 5 and 7 and open or separate the lower portion of said walls from the position shown in Fig. 3. The wall 8 of the said part B is provided with a notch or recess 12, that opens to that edge of the wall 8 that is on the straight side of the plate. In attaching the two parts of the plate together the ends having the walls 5 and 7 are first connected, while the faces of the walls 6 and 8 are in one plane, but not opposite each other. The parts are then moved on the hooked projection 11 as an axis to bring the headed projection 10 into the notch or recess 12, the parts being so fitted that one edge of the notch or recess bears with considerable friction on one side of the shank of the projection 11 and thereby prevents accidental unlocking. This form of plate may be used without springs, or it may be provided with springs of any ordinary form. We prefer, however, to provide the same with our improved form of spring, as hereinafter described.

At the inner edge of each of the parts A B there are two walls or flanges 13 and 14, the confronting ends of which form quite an open space, and adjacent to the wall 13 there is a stud or post 15. The face of the wall 14 that is coincident with the inner edge of the said parts A or B is provided with a short pin or projection 16, and the opposite face of the wall 13 is provided with a similar pin or projection 17.

The springs C are formed of sheet-metal strips curved substantially as shown, with a slot 18 in their body portion, the length of which slot is about equal to the distance from one side of the pin 17 to the opposite side of the pin 16. The springs are secured to the two parts of the plate by first placing one end of the spring between the stud or post 15 and the inner edge of the plate, then slipping the slotted portion of the spring over the pin 17, drawing the spring along until said pin is at that end of the slot, while the body or middle portion of the spring passes through the space between the confronting ends or faces of the walls 13 and 14, substantially as illustrated in Fig. 4, then forcing the spring down to its place and bringing the slot at its other end over the pin 16. The springs are thus firmly and cheaply secured in place, and when the two parts of the plate are locked together around a pipe the ends of the springs that project inside of said parts will bear against the pipe with sufficient friction to hold the plate in position.

We do not claim a two-part floor or ceiling plate with detachable locking devices nor the employment of springs that project at the inner edges of said parts.

We claim as our invention—

1. A two-part floor or ceiling plate the two parts of which are provided with end walls at their confronting ends, the end walls at one side of the plate having the hooked projection on one part and the hole 9 on the other part for receiving said hooked projection, the end walls at the opposite side of the plate having respectively on the two parts the headed projection and open notch or recess for engaging each other, substantially as described.

2. In a floor and ceiling plate, the combination of the parts having the spaced walls at their inner edges, the oppositely-projecting pins on said walls at the opposite sides of the space between them, a stud or post as at 15 adjacent to one of said walls and pins, and the slotted spring bearing against said stud or post, extending through the space between said walls with the opposite ends of its slot engaging said pins and with one end of the spring projecting from the inner edge of the plate, substantially as described.

LYMAN H. SNYDER.
WILLIAM G. CHRISTIAN.

Witnesses:
JAMES SHEPARD,
A. W. STIPEK.